(12) United States Patent
Wu

(10) Patent No.: US 6,571,479 B1
(45) Date of Patent: Jun. 3, 2003

(54) GARDENING SHEARS STRUCTURE

(76) Inventor: Chin-Sung Wu, 3, Lane 30, Tung Lung Road, Lu Kang Town, Chang-Hua (TW)

( * ) Notice: Subject to any disclaimer, the term of this patent is extended or adjusted under 35 U.S.C. 154(b) by 0 days.

(21) Appl. No.: 10/052,523

(22) Filed: Jan. 23, 2002

(51) Int. Cl.$^7$ .............................................. B26B 13/26
(52) U.S. Cl. .............................. 30/248; 30/257; 56/241
(58) Field of Search .......................... 30/254, 244, 245, 30/246, 248, 249, 250, 257, 296.1; 56/239, 241

(56) References Cited

U.S. PATENT DOCUMENTS

| | | | | |
|---|---|---|---|---|
| 2,777,196 A | * | 1/1957 | Zoetemelk | 30/248 |
| 3,157,017 A | * | 11/1964 | Vosbikian | 56/241 |
| 3,174,268 A | * | 3/1965 | Fernandez | 30/257 |
| 3,317,997 A | * | 5/1967 | Hedstrom et al. | 30/248 |
| 3,496,710 A | * | 2/1970 | Smith et al. | 56/241 |

* cited by examiner

Primary Examiner—Hwei-Siu Payer
(74) Attorney, Agent, or Firm—Bacon & Thomas, PLLC

(57) ABSTRACT

A gardening shears structure comprised of a main member, an extension member, a lock sleeve, an upper connecting rod, a coupler, and a lower connecting rod, a handle and a blade mechanism respectively assembled to the upper connecting rod and the lower connecting rod and, furthermore, a mount conjoined onto the handle and an auxiliary handle situated in the mount. During usage, the user grasps the handle with one hand and holds the auxiliary handle in the other hand to increase garden shears operating stability, while the lock sleeve and the coupler provides for control over the extension member and lower connecting rod to vary overall length, thereby providing for length adjustable and even grass trimming performance.

3 Claims, 14 Drawing Sheets

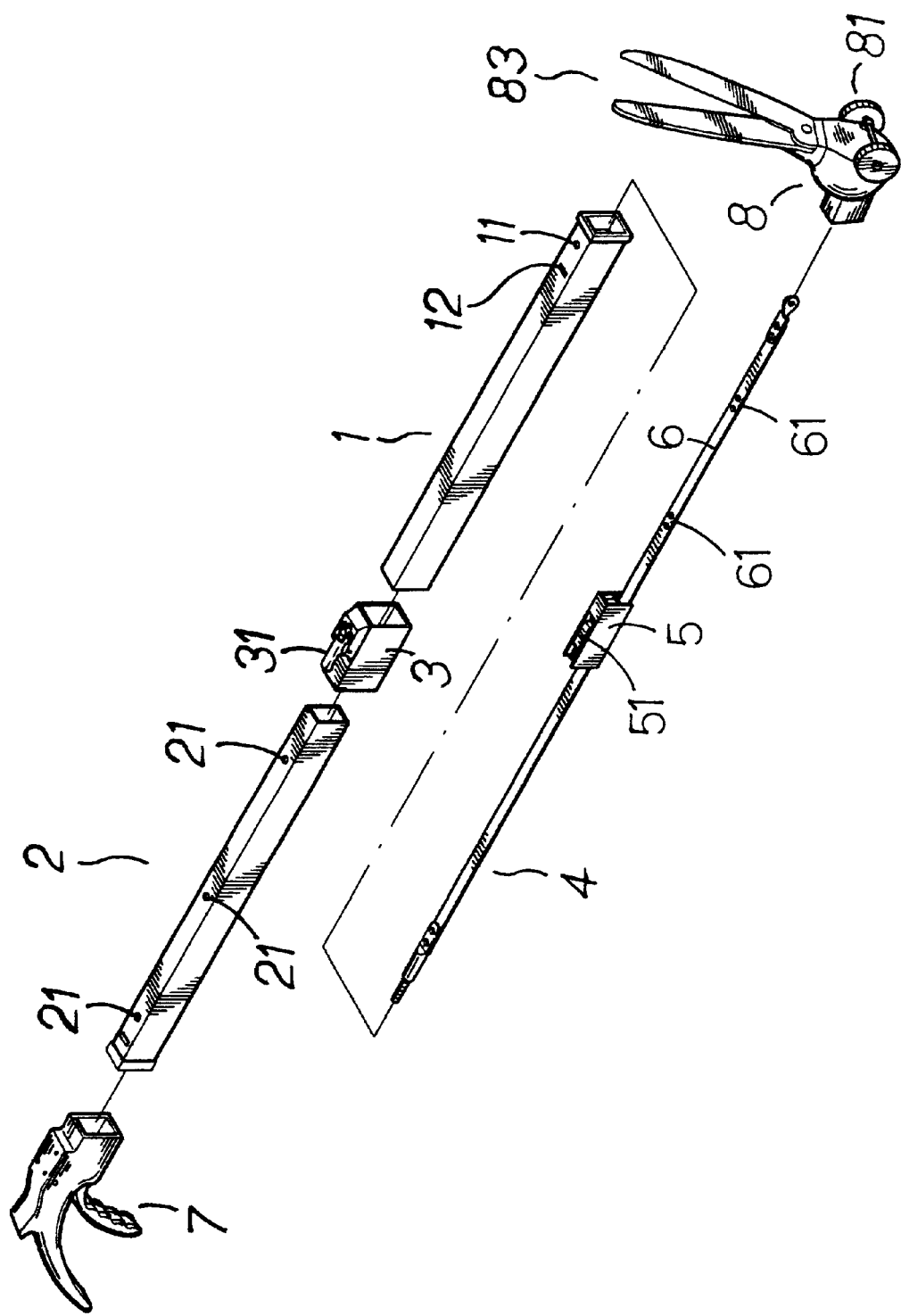
FIG.1-A

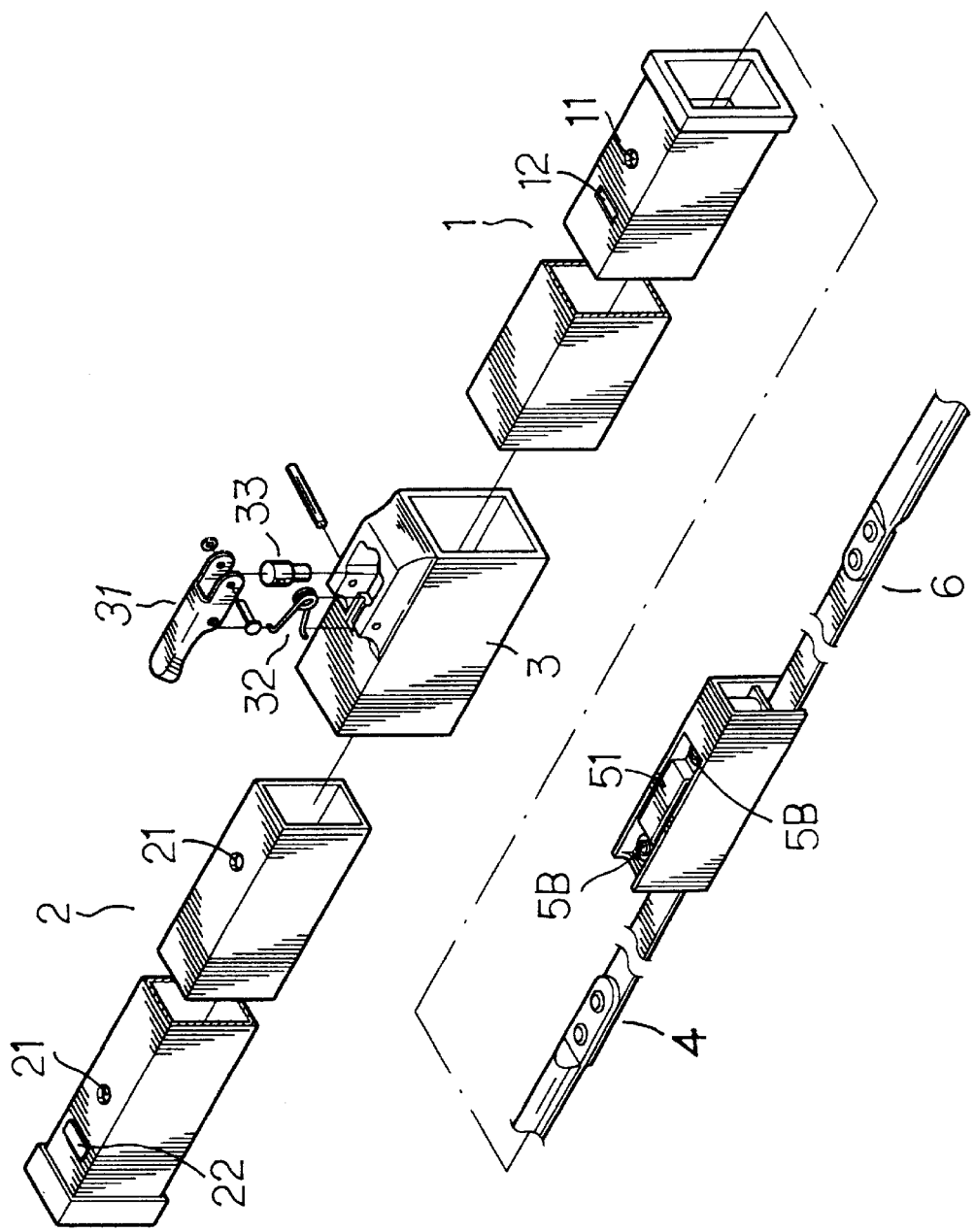
FIG.1-B

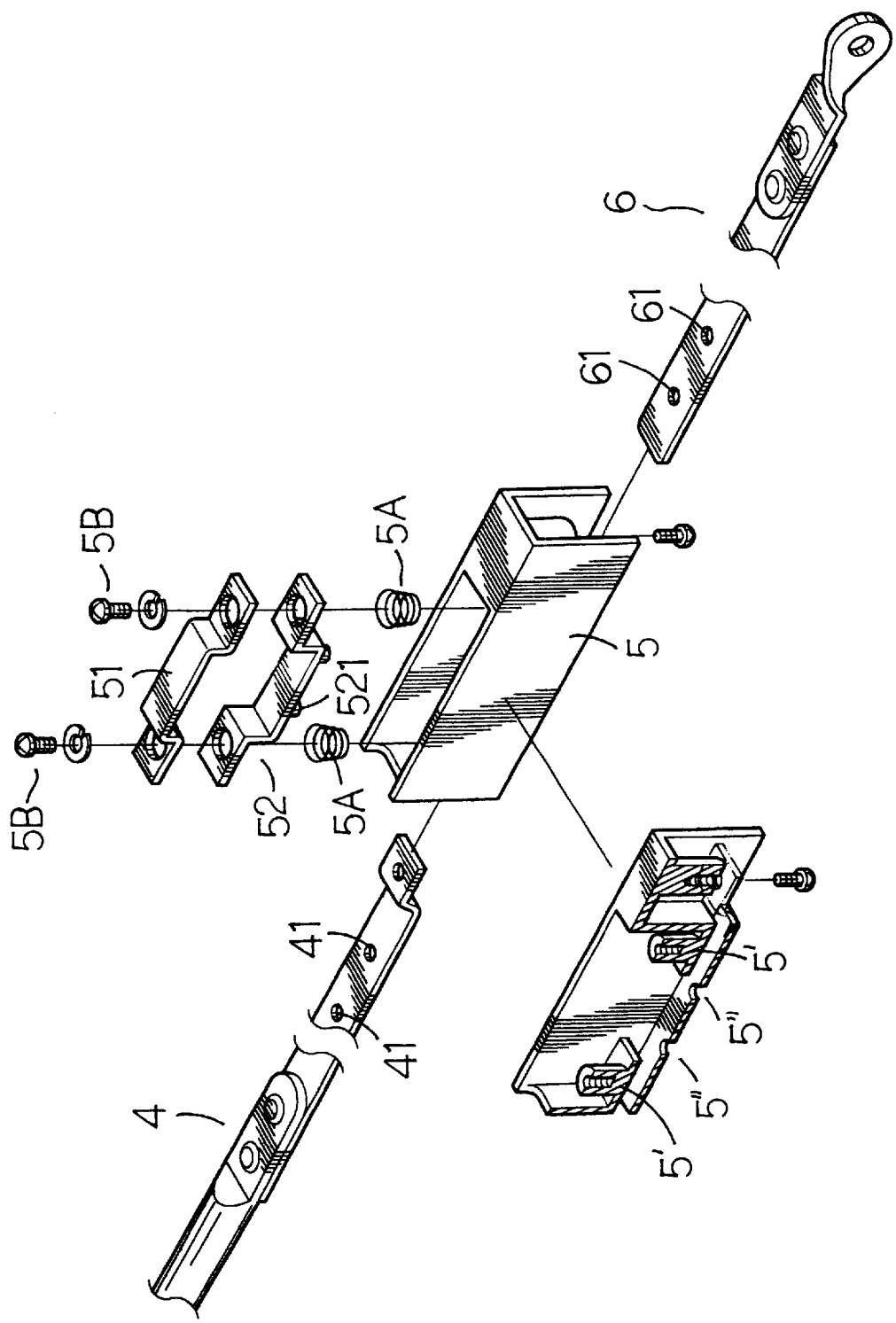
FIG.1-C

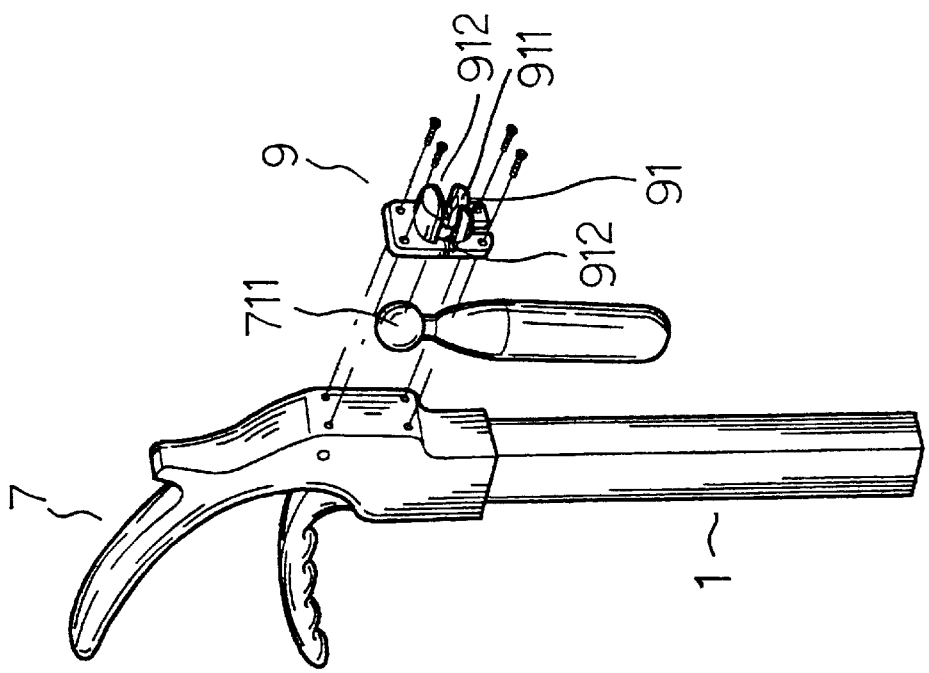
FIG.1-D
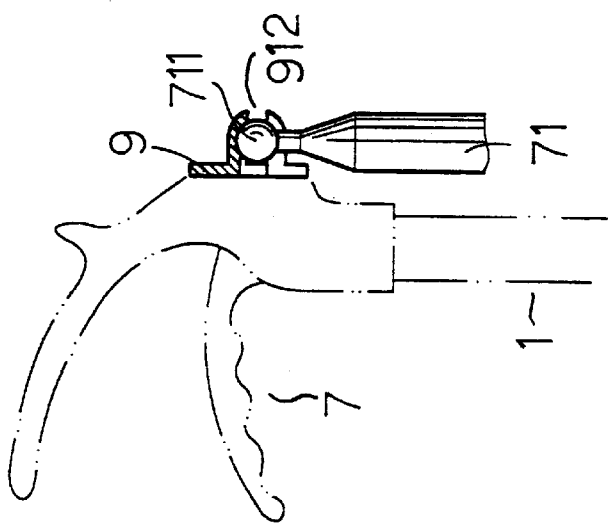
FIG.1-E

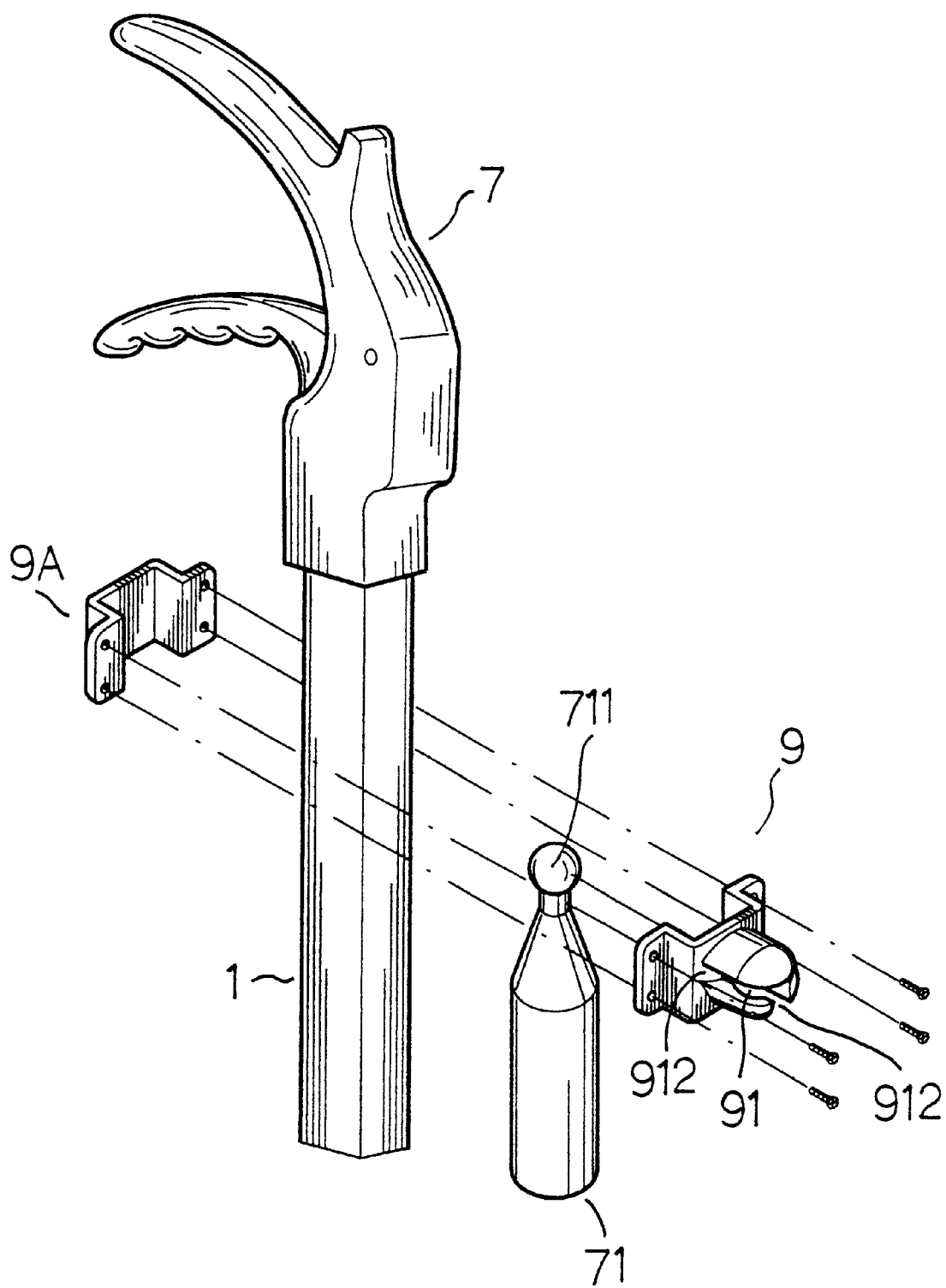
FIG.1-F

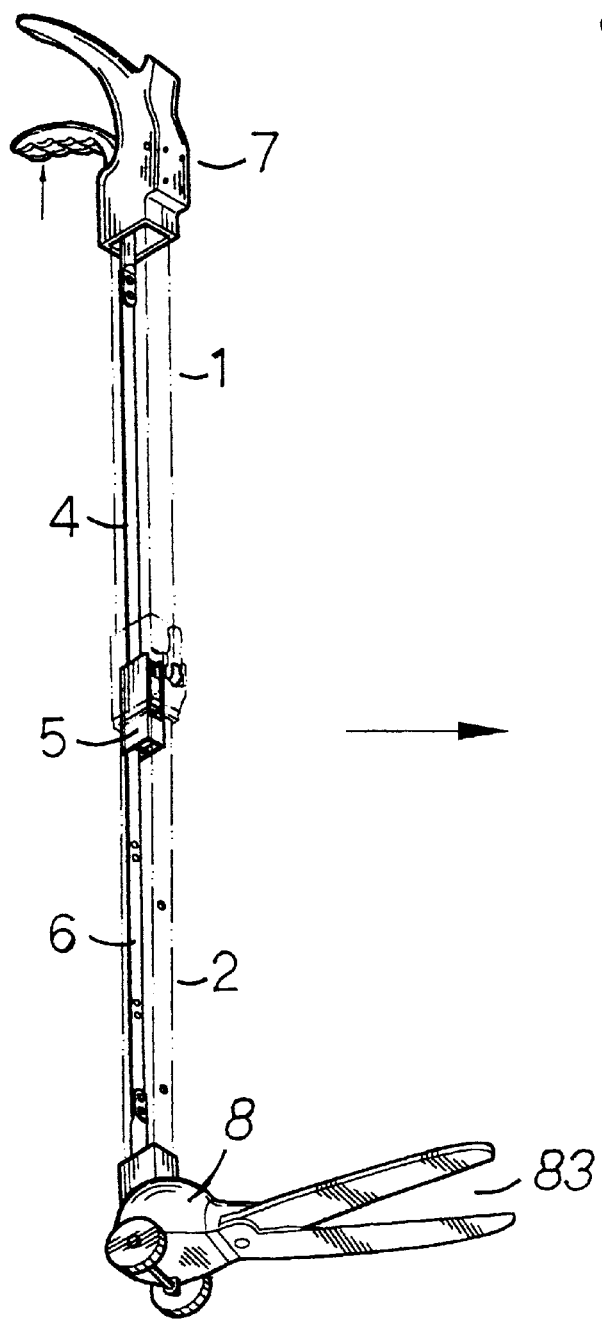
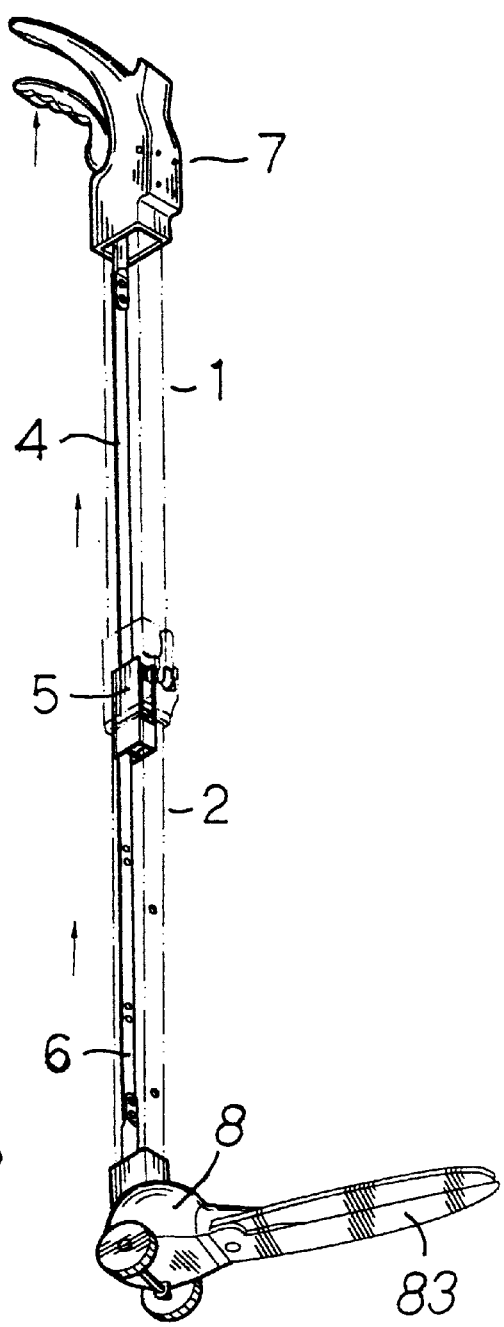
FIG.2-A                    FIG.2-C

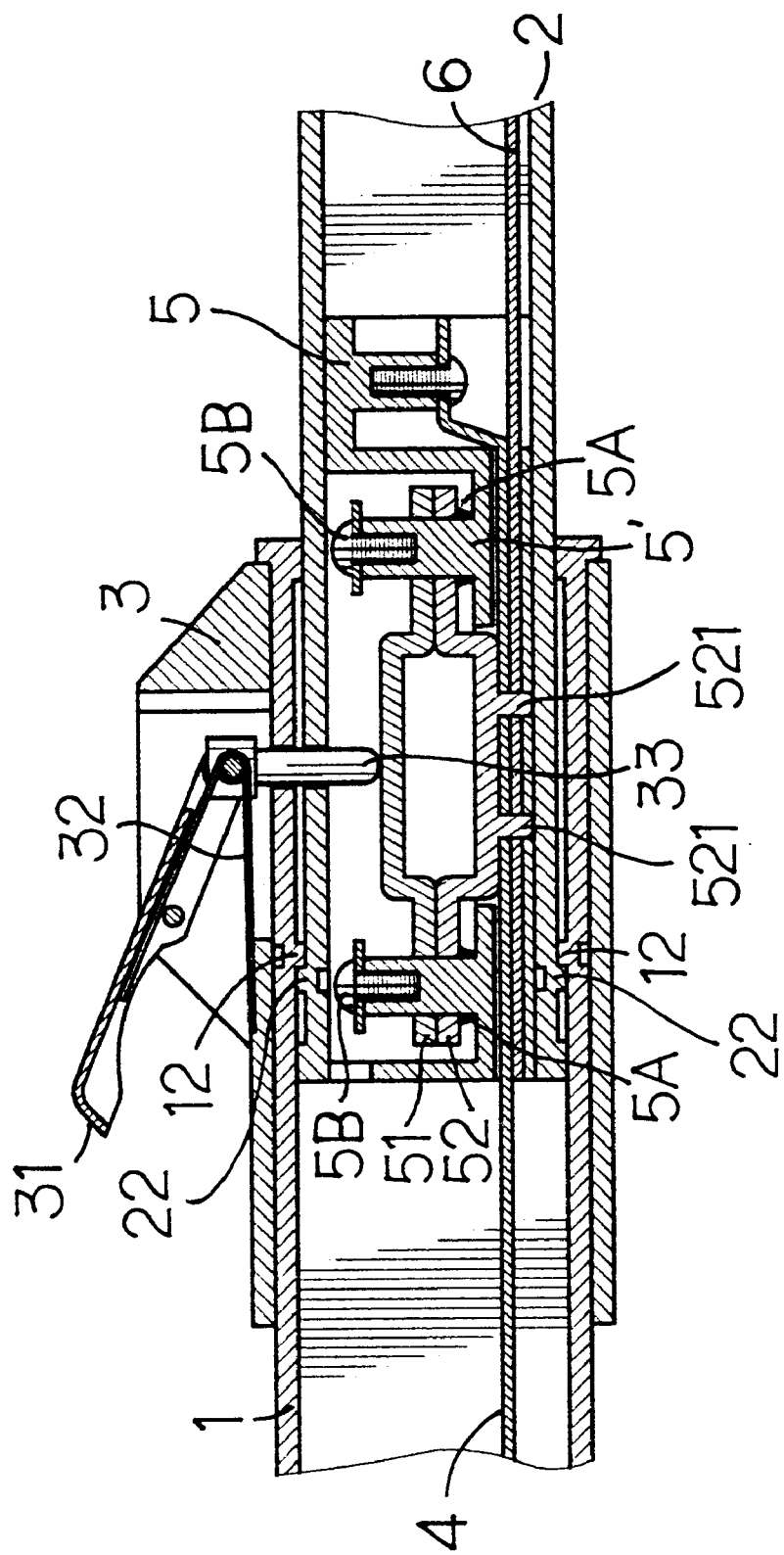
FIG. 2-B

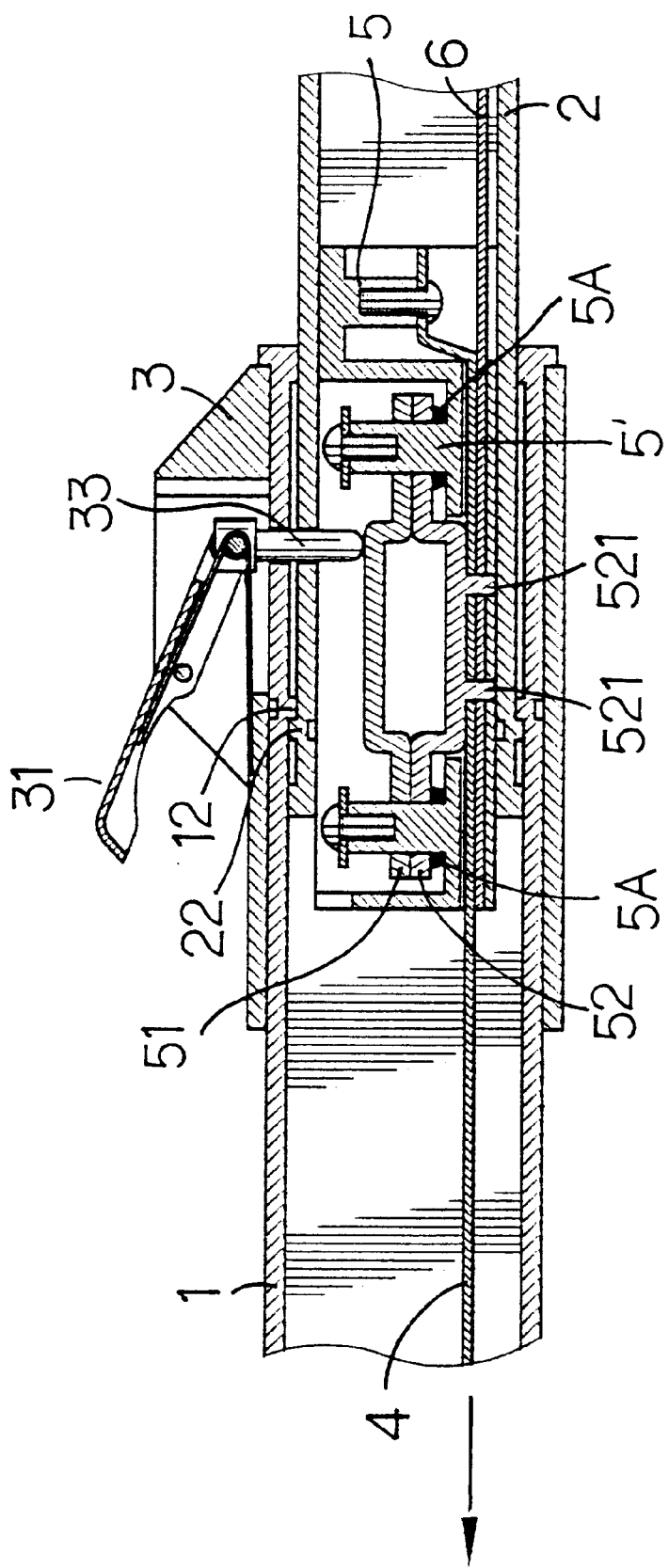
FIG. 2-D

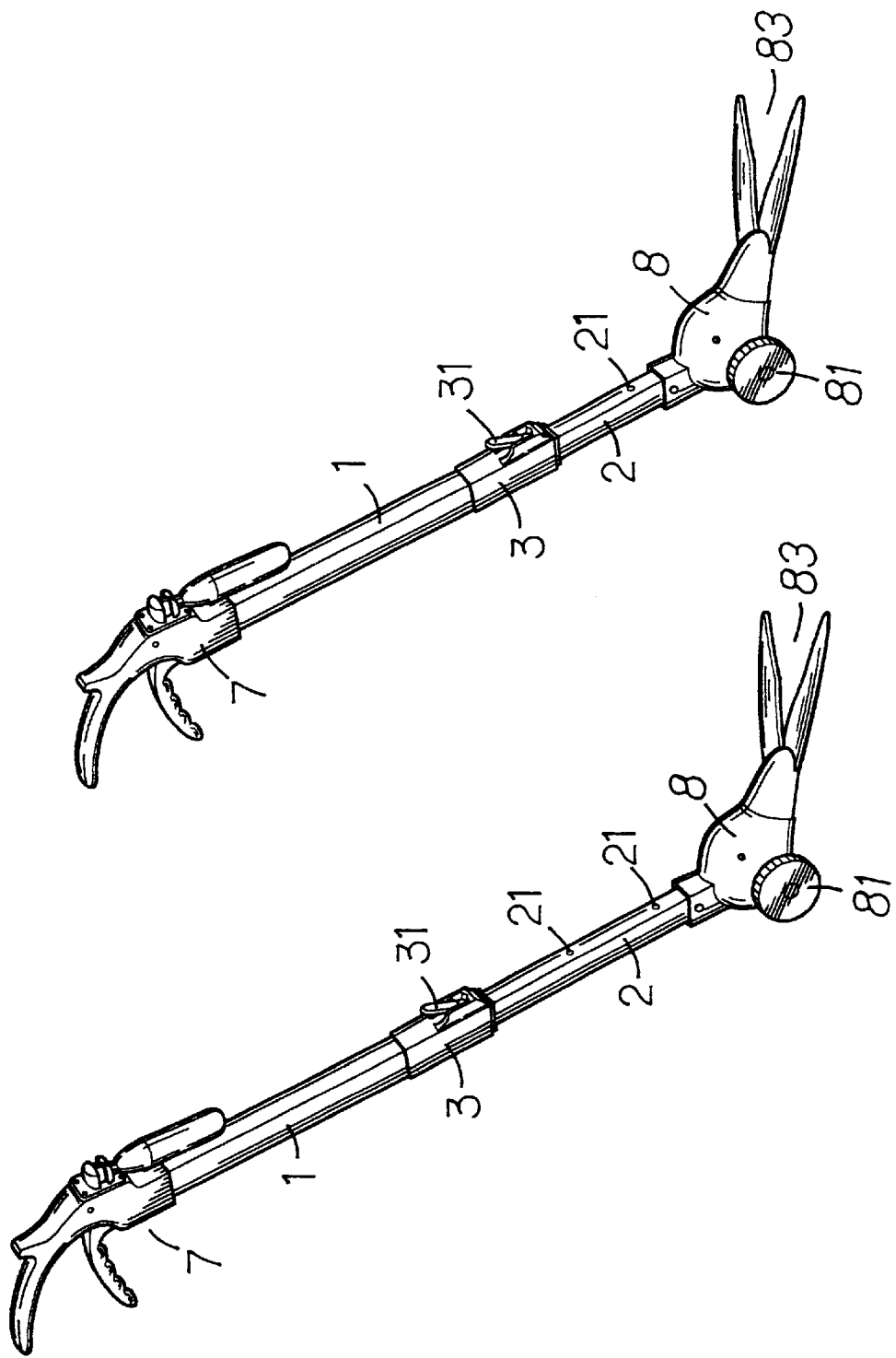

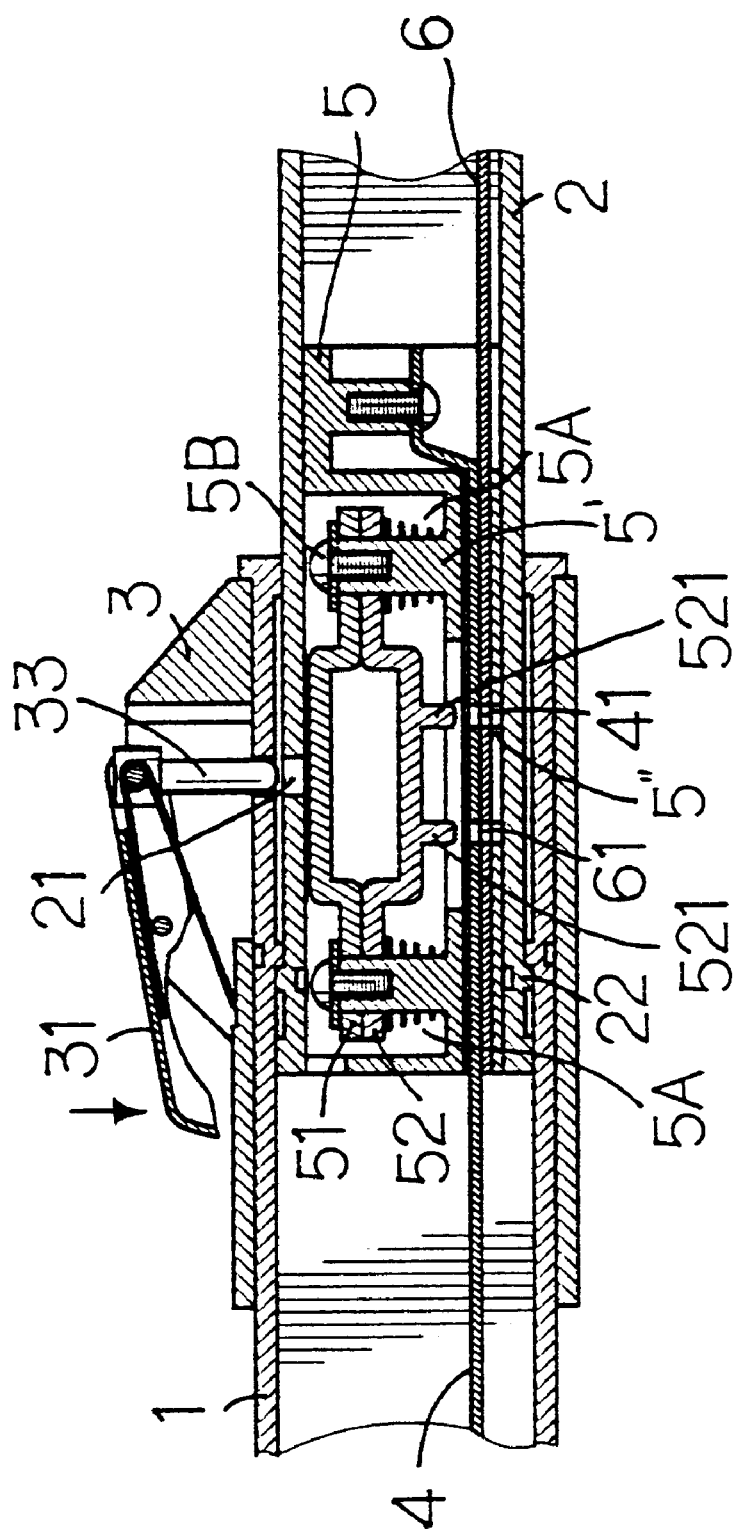
FIG.3-B

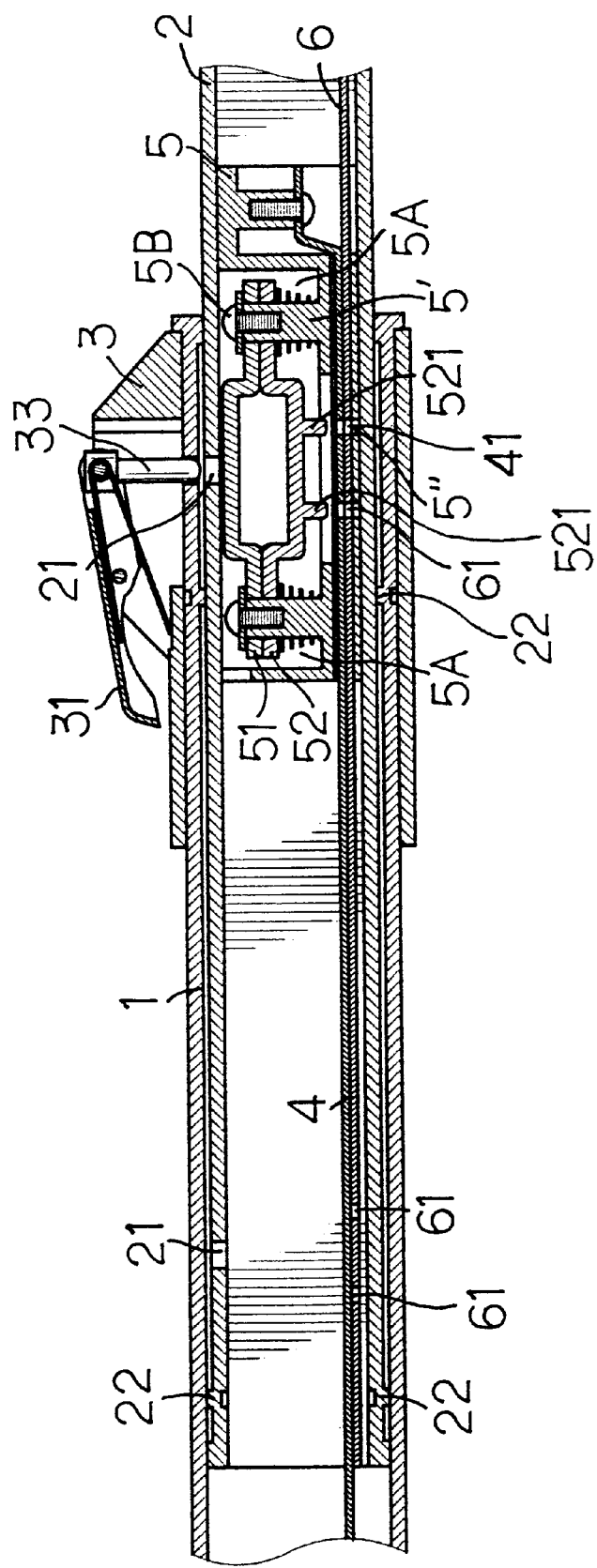
FIG.3-C

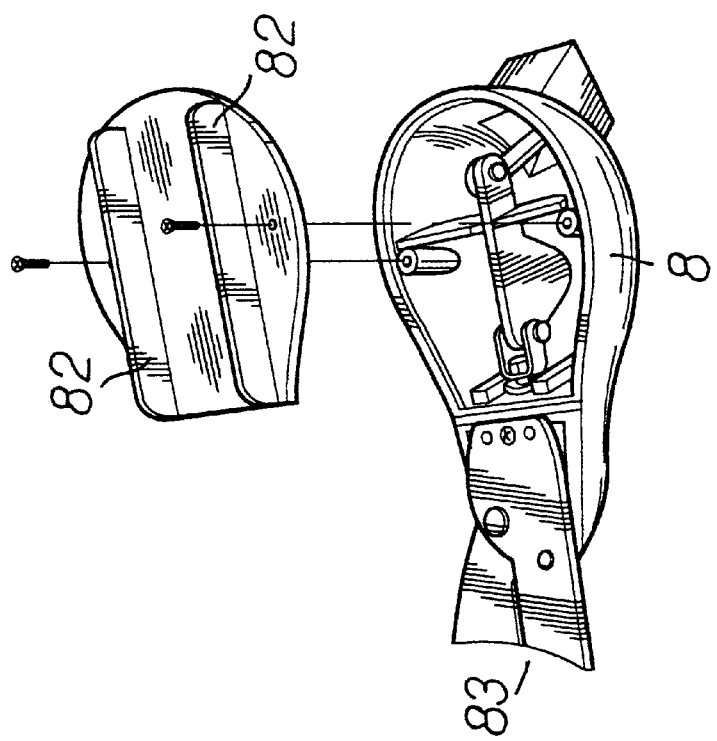
FIG.5-B
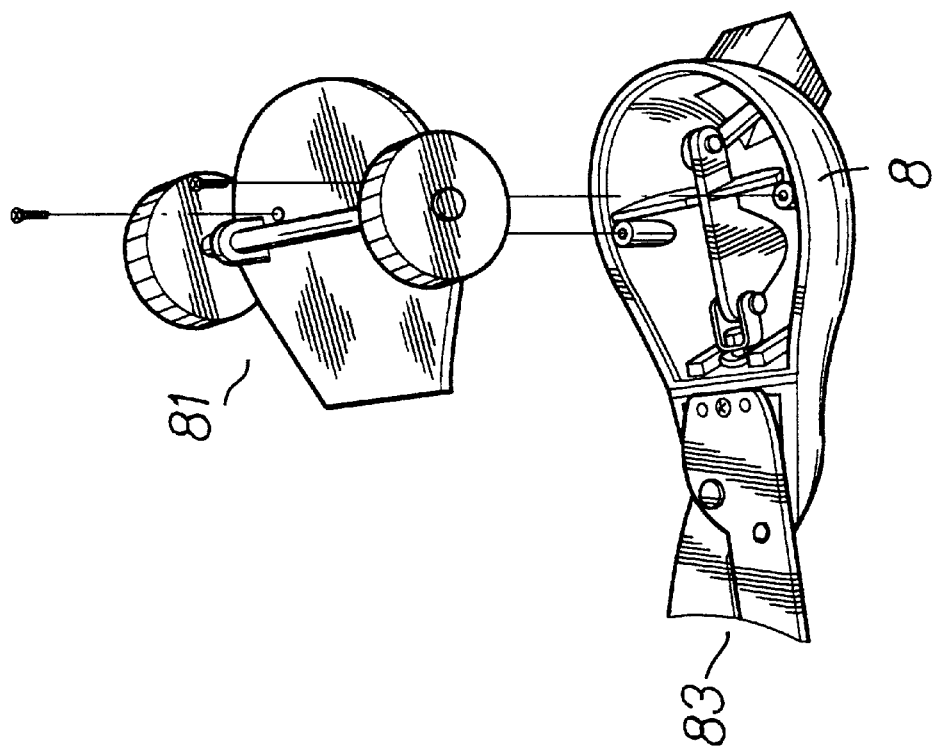
FIG.5-A

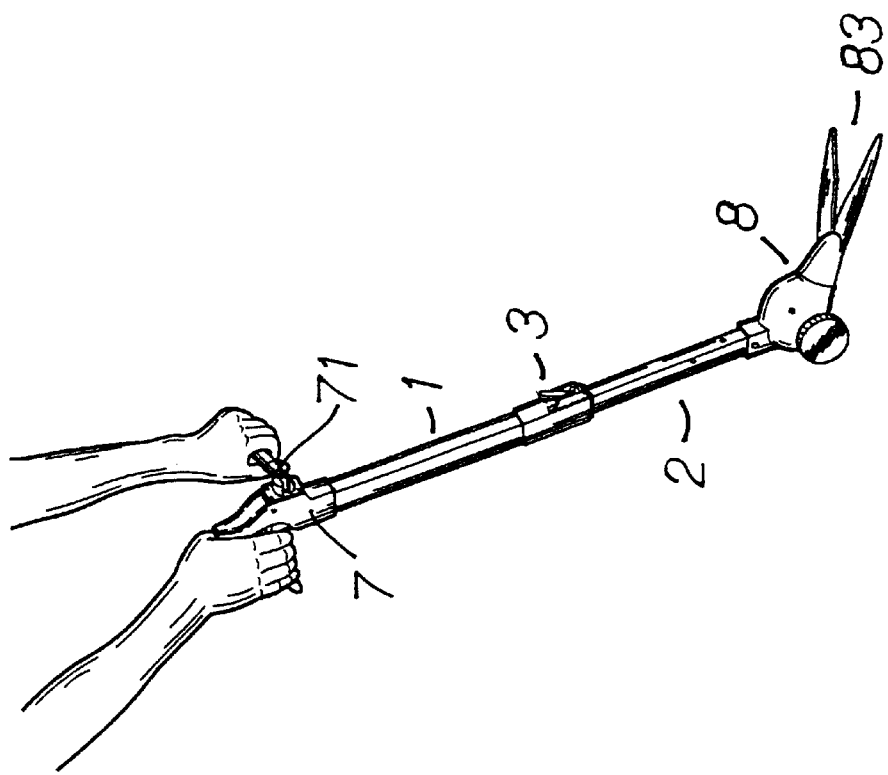
FIG.6-A
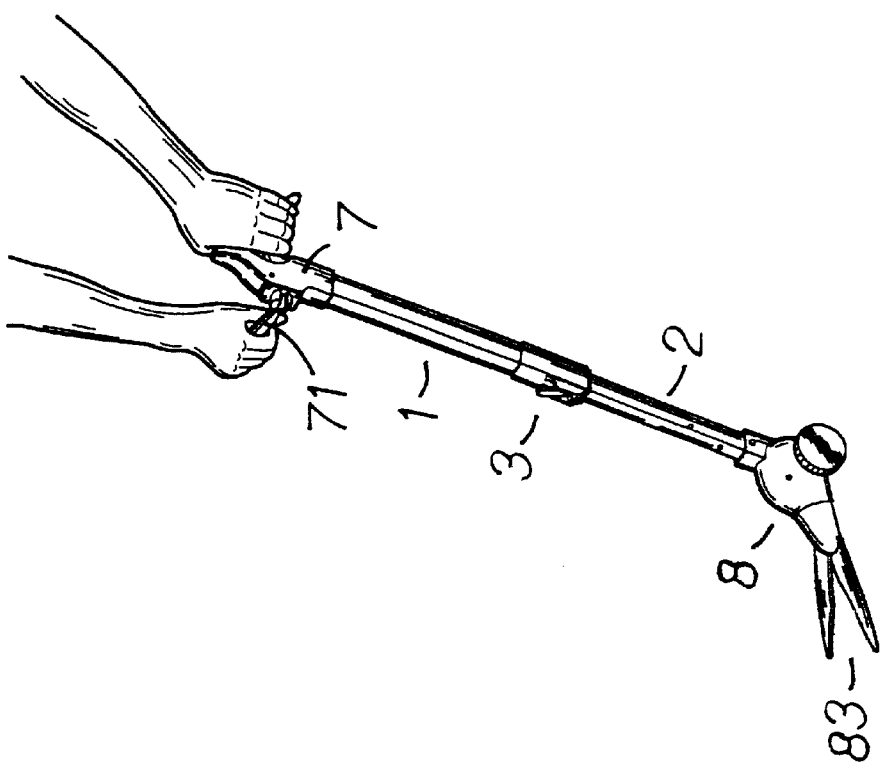
FIG.6-B

GARDENING SHEARS STRUCTURE

BACKGROUND OF THE INVENTION

1) Field of the Invention

The invention herein relates to gardening tools, specifically a gardening shears structure capable of increased operating and grasping stability, while a lock sleeve and a coupler affords control over an extension member and a lower connecting rod to vary overall length, thereby providing for length adjustable and even grass trimming performance.

2) Description of the Prior Art

Conventional gardening shears are typically of a fixed length and not suitable for operation and utilization by users of different physical height. Since the user has to bend at the waist to match the height of the gardening shears when its total length is insufficient, the user experiences waist and back pain. Furthermore, one-handed operation is unsteady and increases grass trimming difficulty, resulting in fatigue as well as aches and pains. As such, grass trimming remains unpleasant work.

In view of the said disadvantageous factors, the inventor of the invention herein conducted extensive research into improvements that culminated in the successful development of the present invention, which is now submitted to the patent bureau as a new patent application.

SUMMARY OF THE INVENTION

The primary objective of the invention herein is to provide a gardening shears structure comprised of comprised of a main member, an extension member, a lock sleeve, an upper connecting rod, a coupler, and a lower connecting rod; a handle and a blade mechanism respectively assembled to the upper connecting rod and the lower connecting rod and, furthermore, a mount conjoined onto the handle and an auxiliary handle situated in the mount. During usage, the user grasps the handle with one hand and holds the auxiliary handle in the other hand to increase garden shears operating stability, while the lock sleeve and the coupler provides for control over the extension member and lower connecting rod to vary overall length, thereby providing for length adjustable and level grass trimming performance.

To provide a further understanding of the structural features and other particulars of the present invention, the brief description of the drawings below are followed by the detailed description of the invention herein.

BRIEF DESCRIPTION OF THE DRAWINGS

FIG. 1-A is an exploded drawing of the invention herein.

FIG. 1-B is an exploded drawing of the lock sleeve of the invention herein.

FIG. 1-C is an exploded drawing of the coupler of the invention herein.

FIG. 1-D is an exploded drawing of section between the handle and the auxiliary handle of the invention herein FIG. 1-E is a cross-sectional drawing of the handle and the auxiliary handle of the invention herein following assembly.

FIG. 1-F is an exploded drawing of the invention herein when equipped with an auxiliary handle of another shape.

FIG. 2-A is an isometric drawing of the invention herein after assembly.

FIG. 2-B is a cross-sectional drawing of the invention herein after assembly.

FIG. 2-C is an isometric drawing of the invention during cutting operation.

FIG. 2-D is a cross-sectional drawing of the invention during cutting operation.

FIG. 3-A is an isometric drawing of the invention herein when the lock sleeve is actuated downward.

FIG. 3-B is a cross-sectional drawing of the invention herein when the lock sleeve is actuated downward.

FIG. 3-C is a cross-sectional drawing of the invention herein when retracted.

FIG. 3-D is an isometric drawing of the invention herein when retracted.

FIG. 5-A is an isometric drawing of the invention herein illustrating the bottom section of the blade mechanism.

FIG. 5-B is an isometric drawing of the invention herein illustrating another bottom section of the blade mechanism.

FIG. 6-A is an isometric drawing of a rotary embodiment of the invention herein.

FIG. 6-B is an isometric drawing of a rotary embodiment of the invention herein, as view from a different angle.

DETAILED DESCRIPTION OF THE INVENTION

Figure 4:
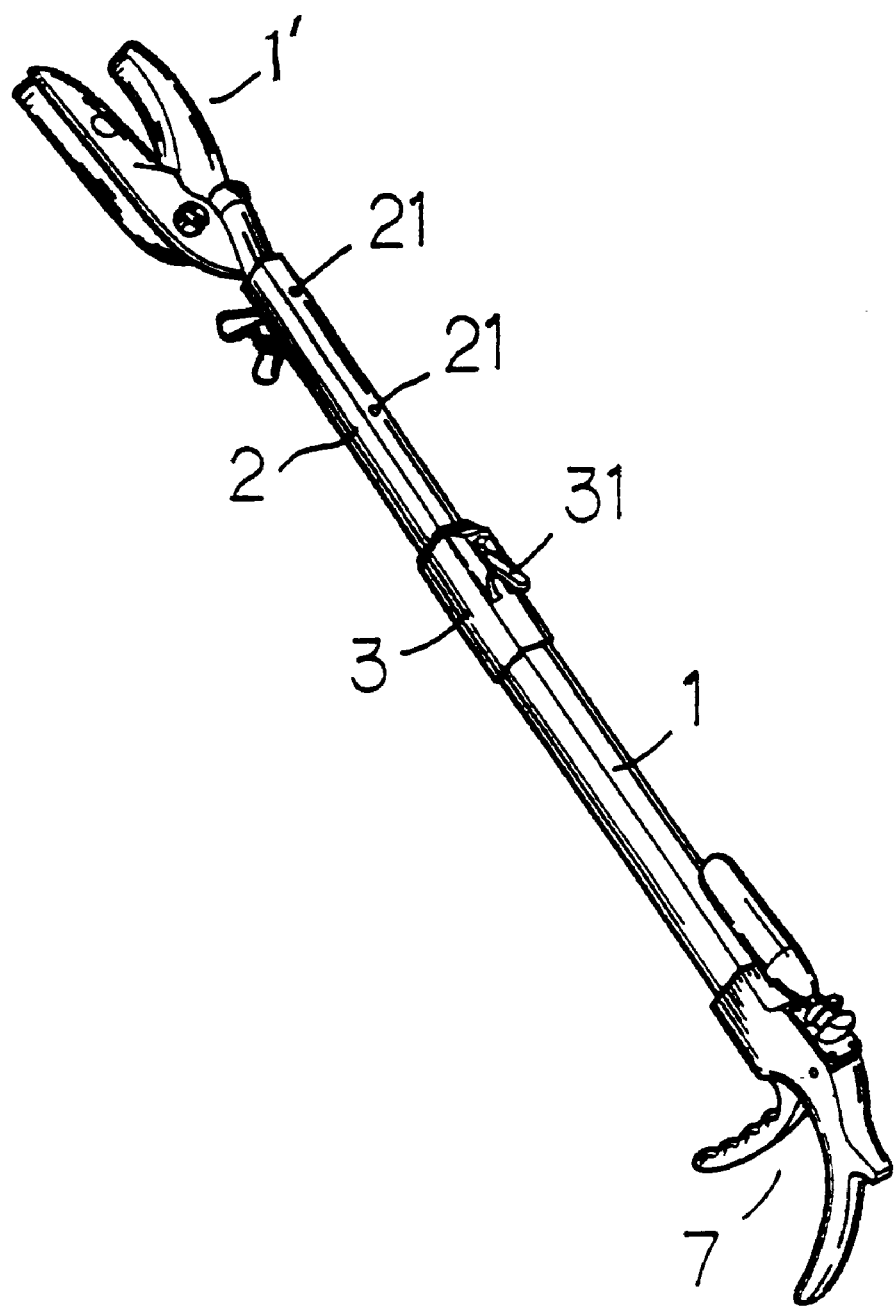
FIG. 4 is an isometric drawing of the invention herein configured for high branch pruning.

Referring to FIG. 1-A, FIG. 1-B, and FIG. 1-C, the gardening shears structure of the invention herein is comprised of a lock sleeve 3 assembled between a main member 1 and an extension member 2 of a smaller width, with an upper connecting rod 4, a coupler 5, and a lower connecting rod 6 disposed within their interior hollow sections such that the upper connecting rod 4 and the lower connecting rod 6 are respectively assembled to a handle 7 and a blade mechanism 8 and, furthermore, a mount 9 conjoined onto the handle 7 and an auxiliary handle 71 situated in the mount 9, wherein the said main member 1 is a hollow tubular construct having an insertion hole 11 and an inwardly protruding section 12 at its lower extremity and the extension member 2 is also a hollow tubular construct having holes 21 disposed a certain interval apart along its surface and an outwardly protruding section 22 emerging from its upper extremity; the lock sleeve 3 consists of a lever 31, a torque spring 32, and a latch column 33 (as shown in FIG. 1-B); the latch column 33 is pivotably linked to one end of the lever 31 and the lever 31 is hinged to the lock sleeve 3 by insertion through the torque spring 32, and based on the principle of applying force to such a projecting element, when one end of the lever 31 is pushed downward, the other end of the lever 31 pushes the latch column 33 inward; the upper connecting rod 4, a coupler 5, and a lower connecting rod 6 within the interior space of the main member 1 and the extension member 2 are of an arrangement wherein there are two hollow posts 5' inside the said coupler 5 and following the sleeving of coil springs 5A, an upper push bar 51 and a lower push bar 52 each having a respective upward and downward squared bend are placed thereon, after which they are fastened to the two hollow posts 5' in the coupler 5 with screws 5B; two locating holes 5" are formed between the two hollow posts 5' of the coupler 5 to provide for the insertion of two positioning posts 521 under the lower push bar 52 (as shown in FIG. 1-C), which are then inserted into holes 41 and 61 respectively disposed at a certain interval apart in the upper connecting rod 4 and lower connecting rod 6 such that the upper connecting rod 4 is secured to the coupler 5; the auxiliary handle 71 is situated between the handle 7 and the mount 9, as indicated in FIG. 1-D, and has a spheroid end 711; the said mount 9 has a recessed opening 91 and, furthermore, a socket 911 is disposed within the interior walls of the opening 91, and a three-way slot 912 is formed along the outer periphery of the opening 91, enabling the placement of the auxiliary handle 71 spheroid end 711 into the mount 9 opening 91, ensconcing within the interior walls of the socket 911, and assembly to the handle 7 as a permanently attached component (as shown in FIG. 1-E) or, as indicated in FIG. 1-F the auxiliary handle 71 is installed onto the main member 1 by means of a U-shaped bracket 9A and the mount 9.

Following the assembly of the said structural components, the latch column 33 on the lock sleeve 3 lever 31 is articulated into a main member 1 insertion hole 11 and an extension member 2 insertion hole 21, pressing the upper push bar 51 and the lower push bar 52 inside the coupler 5 such that the lower push bar 52 positioning posts 521 are inserted into the upper connecting rod 4 holes 41 and the lower connecting rod 6 holes 61, resulting in the conjoinment of the upper connecting rod 4 to the lower connecting rod 6 by the coupler 5, as indicated in FIG. 2-A and FIG. 2-B, while the main member 1 protruding section 12 engages the extension member 2 protruding section 22 to prevent the extension member 2 from being drawn out too far and separating from the main member 1; when the handle 7 is grasped to pull the upper connecting rod 4, the coupler 5 and the lower connecting rod 6 conjoined to the upper connecting rod 4 are moved along with it (while the lock sleeve 3 remains stationary) to drive the cutting operation of the blade mechanism 8, as indicated in FIG. 2-C and FIG. 2-D.

When the user adjusts the overall length of the gardening shears, since the lever 31 is hinged to the lock sleeve 3 by insertion through the torque spring 32, when the lever 31 on the said lock sleeve 3 is depressed, as indicated in FIG. 3-A and FIG. 3-B, based on the principle of applying force to such a projecting element, the latch column 33 at the other end of the lever 31 is moved outward such that the latch column 33 originally slid into a main member 1 insertion hole 11 and an extension member 2 insertion hole 21 is no longer in the extension member 2 insertion hole 21, while extracting the latch column 33 originally pressing the upper push bar 51 and the lower push bar 52 inside the coupler 5 such that the lower push bar 52 positioning posts 521 were inserted into the upper connecting rod 4 holes 41 and the lower connecting rod 6 holes 61 results in the elastic force of the coil springs 5A disengaging the upper push bar 51 and the lower push bar 52 positioning posts 521 from the upper connecting rod 4 holes 41 and the lower connecting rod 6 holes 61; as such, the extension member 2 and the lower connecting rod 6 can be moved towards the main member 1 and the upper connecting rod 4 to gradually shorten the length of the garden shears, as indicated in FIG. 3-C and FIG. 3-D; since the coupler 5 and the upper connecting rod 4 are conjoined into a single structural entity, the coupler 5 is maintained at its original position and is not affected by movement and after the extension member 2 and the lower connecting rod 6 are shortened to an appropriate length, the lever 31 is released and the torque spring 32 returns the lever 31 to its original position, at which time the latch column 33 slides into a main member 1 insertion hole 11 and another extension member 2 insertion hole 21, while also once again pressing the upper push bar 51 and the lower push bar 52 inside the coupler 5 such that the lower push bar 52 positioning posts 521 are inserted into the upper connecting rod 4 holes 41 and the lower connecting rod 6 holes 61 (as shown in FIG. 2-B), with the gardening shears ready for cutting operation and thereby capable of achieving the objective of the length adjustment.

The invention herein can of course be utilized and assembled as a high branch pruning shear 1' and similarly capable of variable length adjustment, as indicated in FIG. 4. Furthermore, wheels 81 (as shown in FIG. 5-A) or runners 82 (as shown in FIG. 5-B) of a suitable height can be installed to the bottom section of the blade mechanism 8 such that after two blades 83 are assembled to the front end of the blade mechanism 8, they are not affected by stones or other obstructions on the ground during cutting operation.

At the same time, when the user (or a left-handed person) operates the present invention, the handle 7 is grasped in one hand and the auxiliary handle 71 is folded out at a level angle and held in the other hand, following which it can be rotated to the left or to the right (as shown in FIG. 6-A and FIG. 6-B) such that when the handle 7 is operating the blade mechanism 8, the auxiliary handle 71 and the handle 7 are situated at virtually the same height to increase operating stability for efficient and easily grass trimming that does not require the user to strenuously bend the waist or back and thereby reduces the physical effort involved.

In summation of the foregoing section, since the present invention is progressive and meets new patent application requirements, the invention herein is submitted to the patent bureau for review and the granting of the commensurate patent rights.

What is claimed is:

1. A gardening shears structure comprised of a main member, an extension member, a lock sleeve, an upper connecting rod, a coupler, and a lower connecting rod; a handle and a blade mechanism respectively assembled to the said upper connecting rod and the said lower connecting rod and, furthermore, a mount conjoined onto the said handle and an auxiliary handle situated in the said mount; the said main member, the said extension member, and the said lock sleeve are conjoined externally forming interior sections and the said upper connecting rod, the said coupler, and the said lower connecting rod are assembled within the interior sections; the said main member is a hollow tubular construct having an insertion hole and an inwardly protruding section at its lower extremity and the said extension member is also a hollow tubular construct having holes disposed a certain interval apart along its surface and an outwardly protruding section emerging from its upper extremity; the said lock sleeve consists of a lever, a torque spring, and a latch column; the said latch column is pivotably linked to one end of the said lever and the said lever is hinged to the said lock sleeve by insertion through the said torque spring; the said coupler has two hollow posts inside and following the sleeving of coil springs, an upper push bar and a lower push bar each having a respective upward and downward squared bend are placed thereon, after which they are fastened to the said two hollow posts in the said coupler with screws and, furthermore, two locating holes are formed between the said two hollow posts of the said coupler to provide for the insertion of two positioning posts under the said lower push bar, which are then inserted into holes respectively disposed at certain intervals apart in the said upper connecting rod and the said lower connecting rod such that the said upper connecting rod is secured to the said coupler; as such, the said latch column on the said lock sleeve lever is articulated into an said main member insertion hole of said main member and an insertion hole of said extension member to press against the said upper push bar and the said inside the said coupler and, furthermore, when the said lower push bar positioning posts are inserted into the said holes of said upper connecting rod and the said lower connecting rod, the said coupler conjoins the said upper connecting rod and the said lower connecting rod into a single structural entity; when the said handle is grasped, the said upper connecting rod drives the said coupler, the said lower connecting rod, and the said blade mechanism into cutting operation; and when the said lever on the said lock sleeve is depressed, the said latch column in it is no longer situated against the said positioning posts inside the said coupler such that the said positioning posts are not in the said extension member and the holes of said lower connecting rod, thereby providing for the shortening or elongating the said extension member and the said lower connecting rod to an appropriate length, thereby achieving the objective of the length adjustment.

2. The gardening shears structure of claim 1 wherein, the said auxiliary handle is assembled into the said mount situated on the said handle or the said main member; the said mount has a recessed opening and, furthermore, a socket is disposed within interior walls of the said recessed opening, a three-way slot is formed along an outer periphery of the said opening, and the auxiliary handle has a spheroid end at one extremity, enabling the placement of the said spheroid end into the recessed opening and ensconcing within the interior walls of the said socket as a permanently attached component; when a right- or left-handed user operates the gardening shears, the said handle is grasped in one hand and the said auxiliary handle is appropriately rotated to the left or to the right and held in the other hand and, as such, grasping stability is increased as the user operates the gardening shears to achieve even grass trimming performance.

3. The of the gardening shears structure of claim 1 wherein, the said blade mechanism can be equipped with wheels or runners of a suitable height installed to its bottom section such that after two blades are assembled to a front end of the said blade mechanism, they are not affected by stones or other obstructions on the ground during cutting operation.

* * * * *